United States Patent
Toskala et al.

(10) Patent No.: US 6,650,905 B1
(45) Date of Patent: Nov. 18, 2003

(54) UNIVERSAL MOBILE TELECOMMUNICATIONS SYSTEM (UMTS) TERRESTRIAL RADIO ACCESS (UTRA) FREQUENCY DIVISION DUPLEX (FDD) DOWNLINK SHARED CHANNEL (DSCH) POWER CONTROL IN SOFT HANDOVER

(75) Inventors: Antti Toskala, Helsinki (FI); Harri Holma, Espoo (FI)

(73) Assignee: Nokia Mobile Phones, Ltd., Espoo (FI)

( * ) Notice: Subject to any disclaimer, the term of this patent is extended or adjusted under 35 U.S.C. 154(b) by 323 days.

(21) Appl. No.: 09/608,642

(22) Filed: Jun. 30, 2000

(51) Int. Cl.[7] ................................................. H04Q 7/20
(52) U.S. Cl. ..................... 455/522; 455/436; 455/439; 455/442; 455/525
(58) Field of Search ............................... 455/436, 442, 455/439, 522, 525

(56) References Cited

U.S. PATENT DOCUMENTS

| | | |
|---|---|---|
| 5,963,870 A | 10/1999 | Chheda et al. |
| 6,374,085 B1 * | 4/2002 | Saints ........................ 455/69 |
| 6,456,604 B1 * | 9/2002 | Lee ............................ 370/328 |

FOREIGN PATENT DOCUMENTS

| | | | |
|---|---|---|---|
| EP | 0936751 | 8/1999 | |
| WO | WO9931819 | 6/1999 | |
| WO | 99/31819 | * 6/1999 | ........... H04B/7/005 |
| WO | WO9941850 | 8/1999 | |

OTHER PUBLICATIONS

"WCDMA for UMTS/Radio Access for Third Generation Mobile Communications", Ed. by H. Holma and A. Toskala, John Wiley & Sons, Ltd. Chichester, England, 2000, Sec. 6.2.2.6, p. 77; and Sec. 6.4.7, pp. 99–100.

3G TS 25.214 v3.1.1 (Dec. 1999), 3rd Generation Partnership Project; Technical Specification Group Radio Access Network; Physical Layer Procedures (FDD (3G TS 25.214 version 3.1.0.

* cited by examiner

Primary Examiner—William Trost
Assistant Examiner—Brandon J Miller
(74) Attorney, Agent, or Firm—Ware, Fressola, Van Der Sluys & Adolphson LLP

(57) ABSTRACT

The indication given by SSDT in soft handover as to whether a cell is primary or not is used by base stations whether or not the base stations actually use it to configure DSCH transmission power with the principle that if the cell is primary, DSCH power is set based on DCH and, if not then a fixed power level or an offset with respect to DCH is used.

17 Claims, 9 Drawing Sheets

UNIVERSAL MOBILE TELECOMMUNICATIONS SYSTEM (UMTS) TERRESTRIAL RADIO ACCESS (UTRA) FREQUENCY DIVISION DUPLEX (FDD) DOWNLINK SHARED CHANNEL (DSCH) POWER CONTROL IN SOFT HANDOVER

TECHNICAL FIELD

The present invention relates to wireless networks and, more particularly, to power control of a downlink shared channel in the context of downlink transmit diversity.

BACKGROUND OF THE INVENTION

Universal Mobile Telecommunications System (UMTS) is to be the third generation mobile system, which is to offer higher data rates and a wide range of telecommunications services, including support for multimedia. UMTS will provide high-quality services with efficient use of network resources. UMTS is to be based on the Global System for Mobile communications (GSM) with some major modifications, e.g., a new radio interface. The UMTS network is to support both circuit-switched and packet-switched services. The circuit-switched technology will be based on the current GSM circuit-switched technology and the packet-switched technology on the General Packet Radio Service (GPRS), which is a new packet service for GSM.

The architecture of UMTS is thus to be based on GSM/GPRS. However, the access network part of UMTS will be new and revolutionary compared to GSM. The UMTS Terrestrial Radio Access (UTRA) Network (UTRAN) will be the new radio interface, which will be able to operate in two different modes: Wideband Code Division Multiple Access (WCDMA) and Time Division/Code Division Multiple Access (TD/CDMA). On the core network side, UMTS will consist of enhanced GSM-based circuit-switched and GPRS-based packet-switched core networks. UTRAN will have the ability to support multiple simultaneous connections for one user, i.e., simultaneous packet- and circuit-switched connections, and every connection can have individual properties, e.g., QoS (quality-of-service) parameters. Contrary to GPRS, UTRAN can also guarantee throughput for a packet-switched connection. This property is vital for some multi-media applications. Despite the wider bandwidth available in the UMTS system compared to GSM, the radio part of the system will remain the most susceptible to bottlenecks. As always, the design objective is an efficient use of limited resources without compromising versatility.

The UMTS packet network architecture will be highly similar to GPRS. However, the naming of some elements and interfaces has been changed from GPRS. FIG. 1 shows the GPRS network architecture, and FIG. 2 shows the UMTS packet network architecture. The UMTS packet network consists of the following network elements:

3G-SGSN: it will be the third generation version of the serving GPRS support node (SGSN).

3G-GGSN: it will be the third generation version of the gateway GPRS support node (GGSN).

HLR: it will be the GSM home location register (HLR) with some updates.

Node B: it will correspond to base transceiver station (BTS) in GSM.

RNC (Radio Network Controller): it will correspond to base station controller (BSC) in GSM.

The core network (CN) part of the packet-switched side will consist of 3G-SGSN, 3G-GGSN and HLR elements. The packet core network will include also the backbone network for connecting core network elements 3G-SGSN and 3G-GGSN together.

Node B and RNC will comprise the radio access network (RAN) part of the UMTS network. RAN will correspond to GSM's BSS (Base Station Subsystem). The responsibility of RAN is the handling of all radio-specific functions, e.g., radio channel ciphering, power control, radio bearer connection setup and release. The basic separation between elements will be that Node B will handle the physical layer functions, and RNC will handle the management functions. However, the separation might be slightly different than in GSM.

As can be seen by comparing FIGS. 1 and 2, the biggest architectural difference will be the new interface (Iur) inside RAN. It will reside between RNCs. In this connection, UMTS introduces a new concept called macrodiversity. In a macrodiversity situation, data will be sent via multiple Node Bs. Because signals will transferred via multiple routes over the air interface and combined in the MS and RNC, e.g., the fading effect will be less harmful, and thus lower power levels can be used. However, those Node Bs may belong to the area of two or more different RNCs, so the interface, i.e., Iur-interface between RNCs is required. In this situation, as shown in FIG. 3, the RNC can be in two logical roles. the RNC can be logically either a "drift" RNC (DRNC) or a "serving" (SRNC).

The actual termination point of the Iu-interface will be SRNC, as shown for both logical possibilities in FIG. 3. The Iu-interface will connect the radio access network (RAN) and core network (CN), whether it be packet- or circuit-switched. SRNC will control information transfer and request radio resources from appropriate DRNCs. The DRNC will only relay information between the MS and SRNC, which is depicted in FIG. 3.

Cell level mobility issues will be handled within UTRAN. When there exists a dedicated connection to the user equipment, the UTRAN will handle the radio interface mobility of the UE. This includes procedures such as soft handover.

For the new macrodiversity concept for 3G, it will be possible to set up multiple radio links simultaneously between a user equipment, for instance, a mobile station, in a wireless telecommunications system, in order to be in a position to decide which of the wireless links from a plurality of base stations is preferred at any given point in time during a communications session and to switch seamlessly between the radio links during the session depending on which link is preferred. In other words, a switch to a base station with a stronger signal can be made without having to set up a new connection. This means that the user equipment should be in a position to measure the magnitude of at least one parameter of the plural radio links simultaneously established between the user equipment and more than one of the plurality of base stations in order to periodically decide which one of the more than one of the plural radio links is currently preferred for use in the communications session between the user equipment and an end terminal connected to the system.

Thus, a soft handover is a category of handover procedures where the radio links are added and abandoned in such a manner that the user equipment (UE) always keeps at least one radio link to the UTRAN. For instance, as shown in FIG. 4, several Node B base stations (BS1, BS2, BS3) are illustrated in several corresponding cells. A user equipment in the form of a mobile station (MS) is shown moving from one cell to another. As the distance from base station 1 (BS1)

increases, as illustrated in FIG. 5, the received signal strength from base station 1 at the mobile station decreases, while the received signal strength from base station 2 (BS2) increases. This is particularly noteworthy in a region of base station diversity shown as a distance window, with the signal strengths from base station 1 and base station 2 crossing over inside the window. Within a threshold region of signal strength, a soft handover can be effected, whereby the mobile station always keeps at least one radio link to the UTRAN effective. A This is distinguished from a hard handover, which would be a handover between different frequencies or between WCDMA and GSM (or a switch from FDD (Frequency Division Duplex) to TDD (Time Division Duplex) within UMTS).

It will be important for WCDMA power control to ensure that each user equipment receives and transmits just enough energy to properly convey information while interfering with other users no more than necessary. As shown in FIG. 6, several mobile stations (MS1, MS2, MS3, MS4) are shown communicating with a base station within a cell via corresponding radio links. FIG. 7 shows received power at the base station (BS) without power control, and FIG. 8 shows received power at the base station with optimal power control. In the downlink direction, a single mobile station sees the power levels of the whole transmission from the base station, and the power levels should in the ideal case vary as a function of the path loss in the downlink, and thus the power levels for optimal power control are different at the different observation points. It is proposed in UMTS to provide a group of functions to control the level of transmitted power, in order to minimize interference and keep the quality of the connections. The proposed functions consist of up and downlink outer loop power control, up and downlink inner loop power control, and up and downlink open loop power control for both ordinary and compressed transmit power.

The open loop power control for both the uplink (UL) and downlink (DL) sets the initial power of the user equipment (UE), i.e., at random access. The function uses UE measurements and broadcasts the cell/system parameters as input. The function is located both in the UTRAN and the UE. The downlink open loop power control receives downlink measurement reports from the UE.

The uplink and downlink inner loop power control set the power of the uplink and downlink dedicated physical channels. For the uplink inner loop power control in FDD, it is a closed loop process located in Node B for FDD. It receives the quality target from the uplink outer loop power control (discussed below), and quality estimates of the uplink dedicated physical control channel. The power control commands are sent on the downlink dedicated physical control channel (DPCCH) to the UE. This function is located in both the UTRAN and the UE.

The uplink outer loop power control is located in the SRNC and sets the target quality value for the UL inner loop power control (which is located in Node B for FDD). It receives input from quality estimates of the transport channel. The UL outer loop channel is used mainly for a long-term quality control of the radio channel. The target quality value is sent to the UE by the SRNC. In FDD, if the connection involves both an SRNS and a DRNS, the function of UL outer loop power control (located in the SRNC) sets the target quality for the UL inner loop power control function (located in Node B).

Similarly, the downlink inner loop power control sets the power of the downlink dedicated physical channels. It receives the quality target from the DL outer loop power control and quality estimates of the downlink dedicated physical control channel. The power control commands are sent on the uplink dedicated physical control channel to the UTRAN. This function is located in both the UTRAN and the UE. For instance, FIG. 9 shows an uplink inner loop power control for two mobile stations (MS1, MS2) in communication with a base station (BS) on corresponding uplinks (P1, P2). If the SIR (Signal-to-Interference Ratio) detected is greater than the SIR set by the UL outer loop power control, then appropriate "down" TPC (transmit power control) commands are sent on the downlink. On the other hand, if the detected SIR is less than the target, the TPC commands command an up increment of power from the mobile station. Typically, the up or down command would be 1 dB within an approximately 70 dB range (21 dBm to −50 dBm) for the uplink and within an approximately 20 dB range for the downlink.

The power control of the downlink shared channel (DSCH), which is a transport channel shared by several UEs and associated with a dedicated channel, can also be controlled in this way (see 3G TS 25.214 v.3.1.1 (1999–12) at Sec. 5.2.2). But the UMTS specifications do not specify exactly how the DSCH power control is normally to be done. Basically, two alternatives exist. Either the DSCH is made to follow the DCH power variations, or the DSCH power level is fixed. For instance, for common channels the approach of the prior art would be to just use a fixed power level or to control the power level slowly via the RNC to follow the dedicated channel power level (although such an approach is not believed to have yet been specified in the interface specifications). As mentioned above, in the downlink direction, a single mobile station sees the power levels of the whole transmission from the base station, and the power levels should, in the ideal case, vary as a function of the path loss in the downlink, and thus the power levels for optimal power control are different, depending upon the location of the mobile station. If the power level for DSCH is fixed, then the power for all users is the same in the downlink and should be sufficient to reach a mobile station at the cell edge, although some of the users would need much less power in practice. On the other hand, if the DSCH power control is done based on the DCH power control, there will be a problem on soft handover. The reason for this is that the user equipment (UE) selects a primary cell periodically by measuring the RSCP (received signal code power) of CPICHs (common pilot channels) transmitted by the active cells. The cell with the highest CPICH RSCP is detected as a primary cell. Normally when a new base station is added, it is expected that the base station can assume that it is primary or close to the primary in the power level for that UE, especially if DSCH traffic for that terminal is handed over to that base station, but then afterwards information is not given if other base stations are dropped or added to the active set in the soft handover state. The prior art methods have no real means to determine if the signal from the base station is the strongest one the terminal is receiving.

Thus, for power control of DSCH, the problem is that the base station is not continually updated on whether the initially indicated soft handover state is still valid or not. Consequently, it could be the case that the power control of the DSCH is being done based on a non-dominating DCH. This would mean that the DSCH power level would be too low.

A solution would be to add a parallel power control loop for DSCH use. But this would be a problem, because DSCH does not contain any pilot bits, and it also has long periods of silent duration. A parallel power control loop for DSCH use, such as a 100 Hz parallel power control loop, would not necessarily be very well "up-to-date" when the transmission on DSCH is initiated (such a solution might, for instance, borrow n symbols per 10 millisecond frame from the existing power control command stream for DSCH use; if borrowing one symbol per 10 millisecond frame the resulting rate would be 100 Hz). Another possibility would be to add a second, fully parallel stream with separate symbols, also with a rate of 1500 Hz (15 slot frames provided at 1500 Hz rate with one slot per frame for power command) for DSCH. But this would be burdensome and would require more changes to the current specification. Also, controlling DSCH on its own is not feasible, since DSCH is discontinuous and since it does not provide reference (pilot) symbols.

DISCLOSURE OF INVENTION

An object of the present invention is to provide a power control of a downlink shared channel in the context of downlink transmit diversity.

According to a first aspect of the invention, a method for use in a wireless telecommunications system having at least one user equipment (UE) and a plurality of base stations connected to a common network controller, wherein said UE is able to periodically determine the magnitude of at least one parameter of plural radio downlinks simultaneously established from more than one of said plurality of base stations to said UE in order to periodically decide which one of said more than one of said plural radio downlinks is from a currently preferred base station for use in a communications session between said UE and an end terminal in communication with said system, comprises the steps of periodically signaling on an uplink from said UE to at least one of said more than one of said plurality of base stations that a downlink to said UE from said at least one of said more than one of said plurality of base stations is or is not from said currently preferred base station, and periodically selecting, in response to said periodic signaling on said uplink from said UE, a power control method for at least said downlink to said UE from said at least one of said more than one of said plurality of base stations.

Further in accordance with the first aspect of the invention, a method wherein in response to said signaling step signaling that said downlink to said UE from said at least one of said one or more base stations is not from said currently preferred base station, said step of periodically selecting selects a fixed power level control method for said downlink to said UE from said not currently preferred base station.

Still in accordance with the first aspect of the invention, a method wherein in response to said signaling step signaling that said downlink from said at least one of said one or more base stations to said UE is from said currently preferred base station, said step of periodically selecting selects a power control method based on a power level of another, related downlink to said UE from said currently preferred base station.

According to a second aspect of the invention, an apparatus for use in a wireless telecommunications system having at least one user equipment (UE) and a plurality of base stations connected to a common network controller, wherein said UE is able to periodically determine the magnitude of at least one parameter of plural radio downlinks simultaneously established from more than one of said plurality of base stations to said UE in order to periodically decide which one of said more than one of said plural radio downlinks is from a currently preferred base station for use in a communications session between said UE and an end terminal in communication with said system, comprises means for periodically signaling on an uplink from said UE to at least one of said more than one of said plurality of base stations that a downlink to said UE from said at least one of said more than one of said plurality of base stations is or is not from said currently preferred base station, and means for periodically selecting, in response to said periodic signaling on said uplink from said UE, a power control method for at least said downlink to said UE from said at least one of said more than one of said plurality of base stations.

In accordance with the second aspect of the invention, an apparatus wherein said means for periodically selecting, in response to said signaling step signaling that said downlink to said UE from said at least one of said one or more base stations is not from said currently preferred base station, selects a fixed power level control method for said downlink to said UE from said not currently preferred base station.

Further in accordance with the second aspect of the invention, an apparatus wherein said means for periodically selecting, in response to said signaling step signaling that said downlink from said at least one of said one or more base stations to said UE is from said currently preferred base station, selects a power control method based on a power level of another, related downlink to said UE from said currently preferred base station.

According to a third aspect of the invention, a user equipment (UE) for use in a wireless telecommunications system having at least one said UE and a plurality of base stations connected to a common network controller, wherein said UE is able to periodically determine the magnitude of at least one parameter of plural radio downlinks simultaneously established from more than one of said plurality of base stations to said UE in order to periodically decide which one of said more than one of said plural radio downlinks is from a currently-preferred base station for use in a communications session between said UE and an end terminal in communication with said system, said UE comprises sensing means, responsive to a downlink signal from a plurality of base stations for providing a corresponding plurality of sensed signals, storage means responsive to said plurality of sensed signals for storing said plurality of sensed signals and for providing said plurality of sensed signals from storage upon demand, comparator means responsive to said plurality of sensed signals retrieved from said storage means for comparing a parameter relating to said sensed signals for providing an comparison signal indicative of a comparison between the parameter magnitudes of said sensed signals, selection means responsive to said comparison signal from said comparator means for selecting a preferred base station and for providing a selection signal indicative thereof, and signaling means responsive to said selection signal for providing an uplink signal indicative of the preferred base station.

According to a fourth aspect of the invention, an apparatus for use in a wireless telecommunications system having at least one user equipment (UE), wherein said system includes a plurality of base stations connected to a common network controller, wherein said UE is able to periodically determine the magnitude of at least one parameter of plural radio downlinks simultaneously established from more than one of said plurality of base stations to said UE in order to periodically decide which one of said more than one of said plural radio downlinks is from a currently-preferred base station for use in a communications session between said UE and an end terminal in communication with said system, wherein said apparatus is responsive to a selection signal from a user equipment indicating an identification of a preferred base station, said apparatus comprises selecting means responsive to said uplink signal for determining whether the base station is preferred or not and providing a selection signal indicative thereof, and power control means responsive to said selection signal, for providing a downlink control signal to said user equipment with a power level selected according to whether or not a preferred base station is determined.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 10:
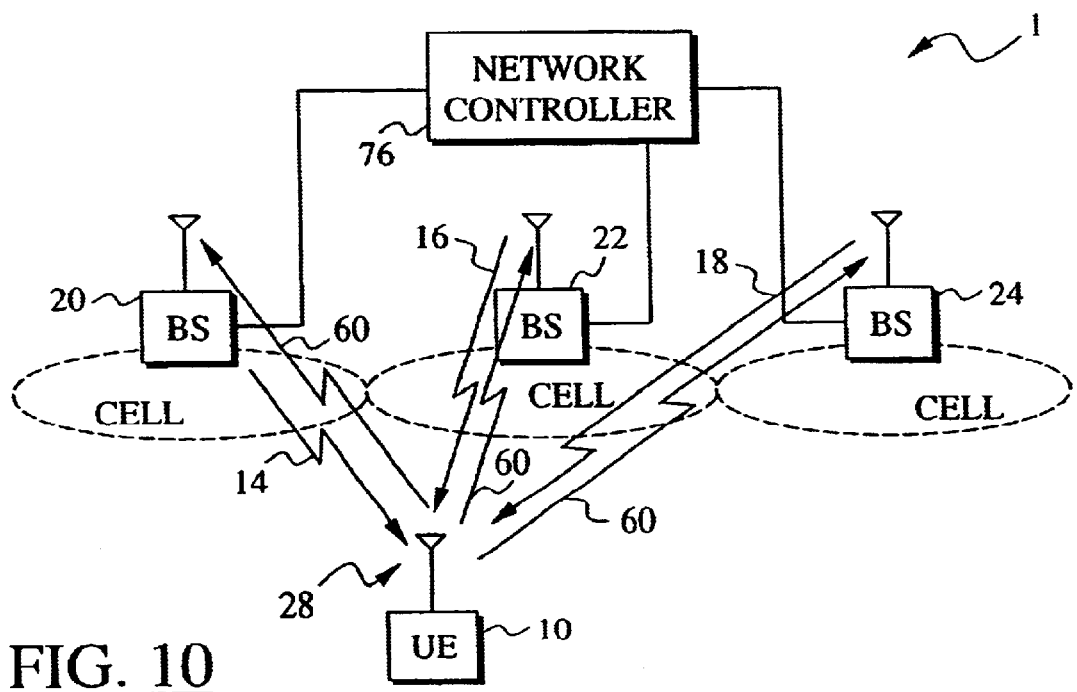
FIG. 10 shows a wireless telecommunications system having at least one user equipment (UE) and a plurality of base stations connected to a common network controller, wherein the UE is able to periodically determine the magnitude of at least one parameter of plural radio downlinks simultaneously established from more than one of the plurality of base stations to the UE in order to periodically decide which one of the more than one of the plural radio downlinks is from a currently-preferred base station for use in a communications session between the UE and an end terminal in communication with the system.
Figure 9:
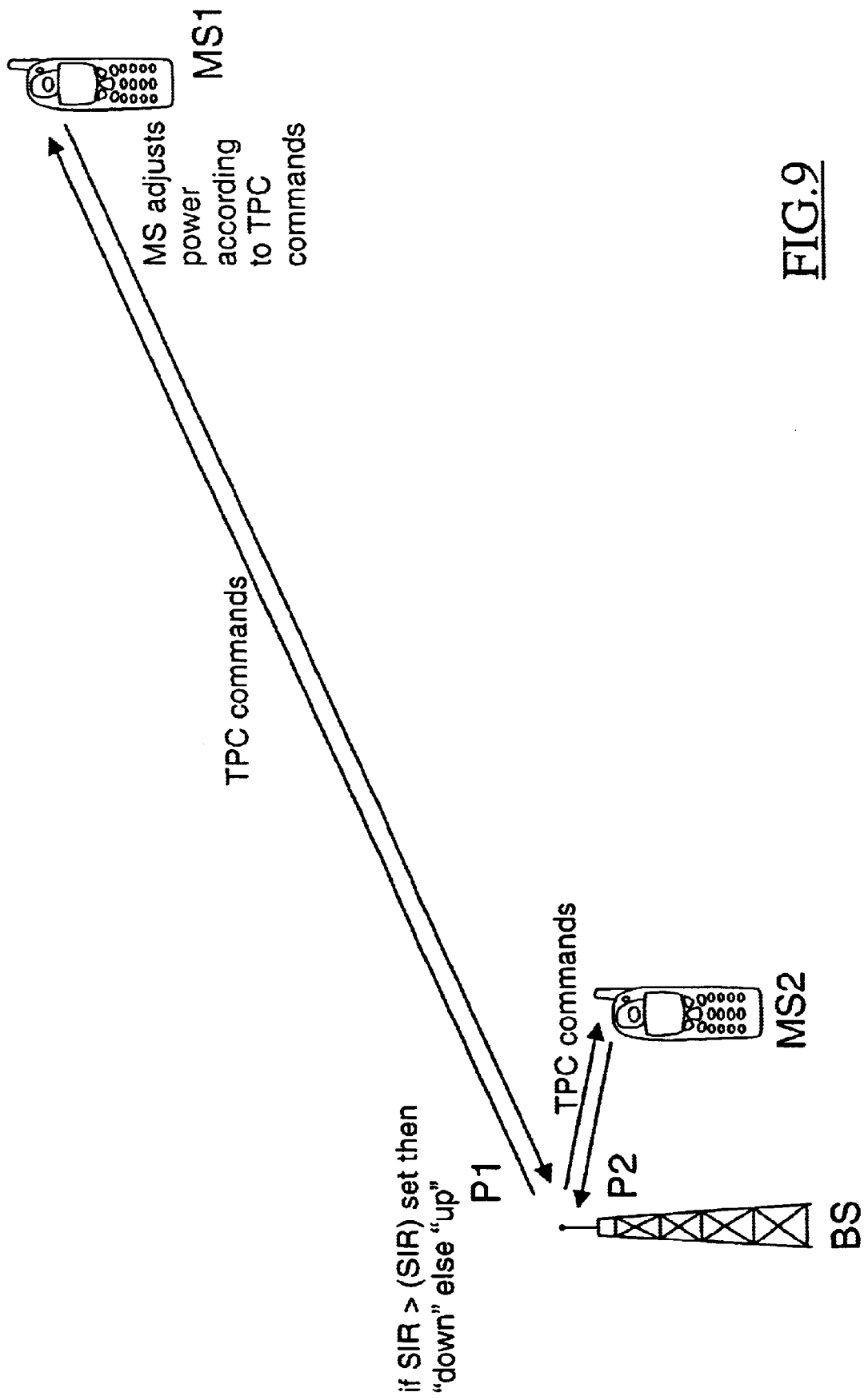
FIG. 9 shows a known fast closed loop power control, which is essential in WCDMA.
Figure 11:
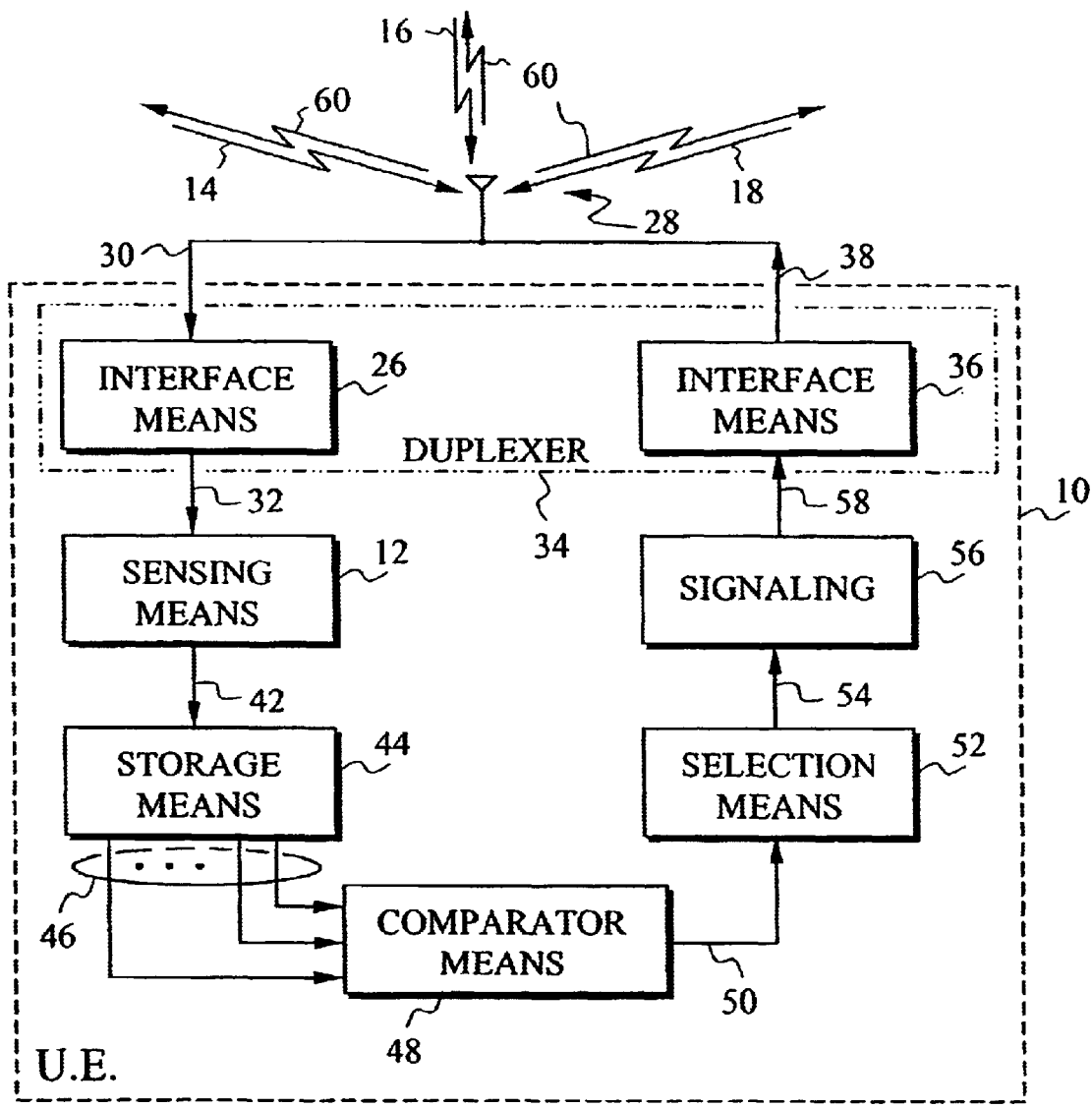
FIG. 11 shows the UE of FIG. 10 in more detail, according to the present invention.

FIG. 10 shows a user equipment (UE), for instance, in the form of a mobile station 10 having multiple radio links simultaneously established between itself and plural base stations (BS) in a wireless telecommunications system using the macrodiversity concept. In order to be in a position to decide which of the wireless links from the plurality of base stations is preferred at any given point in time during a communications session and to be able to switch seamlessly between the radio links during the session depending on which link is preferred, the UE should have sensing means 12, such as shown in FIG. 11, responsive to a selected parameter of the various downlinks 14, 16, 18 from respective base stations 20, 22, 24. An interface means 26 may be provided connected to an antenna 28, which provides the sensed downlink signals 14, 16, 18 to the interface means. The interface means receives the downlink signals on a signal line 30 connected to the antenna and provides an output signal on a line 32 to the sensing means 12 indicative of the received downlink signals 14, 16, 18. The interface means 26 may form part of a duplexer 34 which may also include an interface means 36 for providing an uplink signal on a line 38 to the antenna 28.

The sensing means 12 senses the downlink signals on the line 32 and provides a sensed signal on a line 42 having a magnitude indicative of the selected sensed parameter sensed by the sensing means 12. This may be, for instance, signal strength. A storage means 44 is responsive to the sensed signal on the line 42 for temporarily storing the magnitude of the sensed parameter for each of the respective downlinks 14, 16, 18. Once stored, these stored signal magnitudes can be provided on demand as signal outputs on lines 46 to a comparator means 48 for comparison therein. The comparator means 48 can, for instance, determine the downlink 14, 16, 18 with the largest magnitude signal strength. It can then indicate on a signal line 50 which downlink 14, 16, 18 has the largest signal strength magnitude. A selection means 52 responsive to the signal on the line 50 can then select or designate a preferred base station from which the downlink with the largest signal magnitude is currently emanating. It can indicate this selection on a selection signal line 54 to a signaling means 56, which in response thereto signals the identity of the selected base station on a signal line 58 to the interface means 36 which, in turn, provides the identification or selection signal as an uplink on the line 38 to the antenna 28, where it is radiated as an uplink identification or selection signal as indicated on an uplink signal line 60 which may be distinct. This process is repeated periodically in order to decide as the mobile station moves about in relation to the various base stations, which one of the more than one of the plural radio links is currently preferred for use in the communications session between the user equipment and an end terminal (not shown) connected to the system. Thus, if a particular station loses signal strength and another gains as the mobile station moves in relation to the base station, the user equipment can signal this information upstream and indicate which base station is currently preferred for providing the downlink that actually is currently selected for carrying the session. Portions of the downlinks that are not selected can be shut off, e.g., data carrying portions (as opposed to voice).

It should be realized that the components shown in the UE of FIG. 11 are functional blocks that need not be carried out as discrete entities, as shown. In fact, they are more likely to be carried out as executable software code resident in a permanent memory installed in the UE. Such a configuration is well known and can generally be represented as a general or special purpose signal processor including a central processing unit (CPU), a read-only memory (ROM) for storing the executable code, a random access memory (RAM) for storing temporary computational results, stored data information and the like, various input/output (I/O) devices, timing means including a clock, all interconnected by data, address and control buses. The functions of the blocks shown in FIG. 11 can then be carried out in such software code stored in a ROM, as mentioned, and can be written by any person skilled in the art consulting FIG. 11 or a flowchart, state diagram or the like describing such functions. It will thus be realized that the various functional blocks shown in FIG. 11 can be divided or combined according to the selected algorithm. For instance, the comparator means 48 and selection means 52 can be carried out as a single functional block, whereby the result of the comparison automatically indicates the preferred base station without having to go through an extra selection step. Likewise, the various other blocks shown in both FIG. 11 and FIGS. 10, 12 and 13, can be functionally transferred to other blocks or combined with other blocks.

Figure 12:
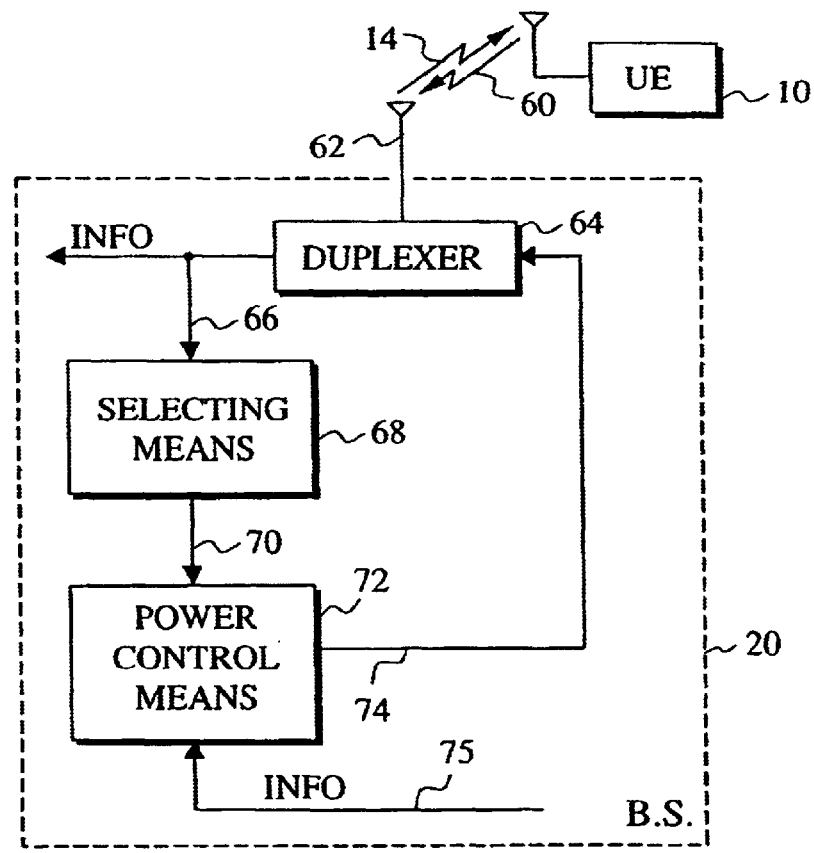
FIG. 12 shows one of the base stations of FIG. 10 in more detail, according to the present invention.
Figure 7:
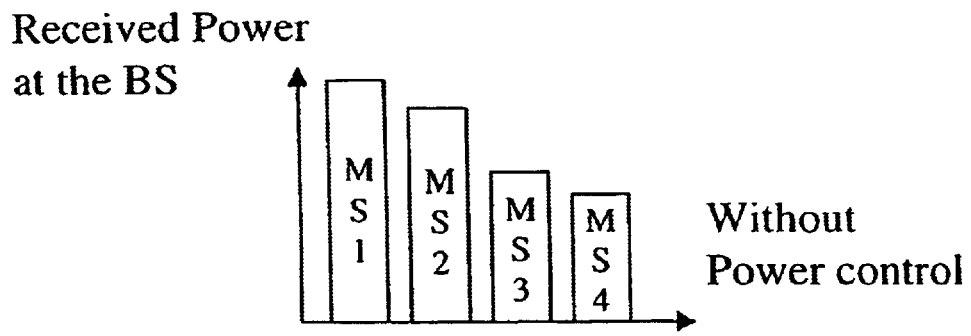
FIG. 7 shows the various power levels received at the various mobile stations of FIG. 6 from the base station without any power control.
Figure 8:
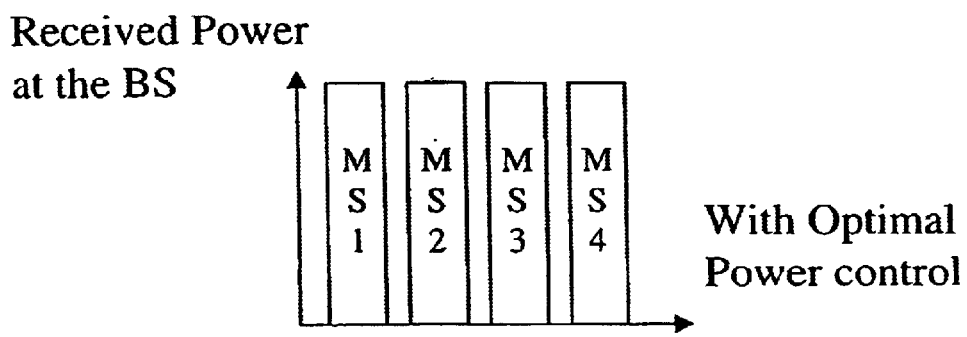
FIG. 8 shows the same situation as shown in FIG. 6, except with optimal power.

Referring now to FIG. 12, one of the base stations 20 shown in FIG. 10 is illustrated with an antenna 62 for providing the downlink 14 at a power level controlled according to the invention, as well as for receiving the uplink 60 from the UE. It may include separate antennas but is shown with a duplexer 64 for use with a single antenna. The duplexer is responsive to the uplink signal on the line 60 from the UE from the antenna and provides the downlink signal on a line 66 to a selecting means 68 for providing a selection signal on a line 70 to a power control means 72 which controls the level of power provided on the downlink 14 by means of an output signal on a line 74 to the duplexer 64. The power control means is responsive to a downlink information or voice signal on a line 75 which contains the intelligence to be transmitted on the downlink 14. I.e., the power control means 72 provides the signal on the line 75 as its output on the line 74 at varying power levels depending on the signal on the line 70. In this way, the base station can be responsive to the uplink signal on the line 60, which is indicative of whether or not the base station is preferred for providing the downlink signal on the line 14. The information signal on the line 75 can instead be provided to another, parallel device which is, in turn, controlled by the signal on the line 74 operating as a control signal.

As mentioned, the process of selection at the UE can be based on a parameter of the downlink, such as signal strength. Normally, one of the base stations 20, 22, . . . , 24 would be selected as the preferred base station and would be the only one supplying the communications session ongoing between the UE and the not-shown terminal connected to the system. It should also be mentioned that the base stations 20, 22, 24 may be connected to a common network controller 76, which is in turn connected to other, hierarchically higher control devices within the mobile telecommunications system. However, for purposes of illustrating the present invention, it is not necessary to show such other devices. It will be realized that the functional block shown situated in the base station 20 of FIG. 12 could therefore be carried out in whole or in part at different hierarchical levels within the mobile telecommunications system. For instance, all or part of the functions can be carried out at the upstream RNC (see FIG. 2) instead of at the base station (Node B).

A specific application of the present invention will now be described in connection with the DSCH proposed for WCDMA. The DSCH (downlink shared channel) is to be used in WCDMA for transmission of packet data in the downlink. The DSCH is a common channel that is operated in such a way as to always be associated with a dedicated channel (DCH). The main reason for the use of DSCH is the saving of the orthogonal code resource when compared to the case that a dedicated channel resource is reserved for all users according to the maximum peak data rate. An example use is to allocate the speech service on a dedicated channel and then the packet data service on the DSCH. In that event, DSCH is most usable for services where delay may vary, such as non-real time packet data (worldwide-web-browsing, etc.). (See "WCDMA for UMTS, Radio Access for Third Generation Mobile Communications", edited by Holma and Toskala, Wiley 2000, Sec. 6.2.2.6 at page 77, and Sec. 6.4.7 at pp. 99–100.)

Figure 13:
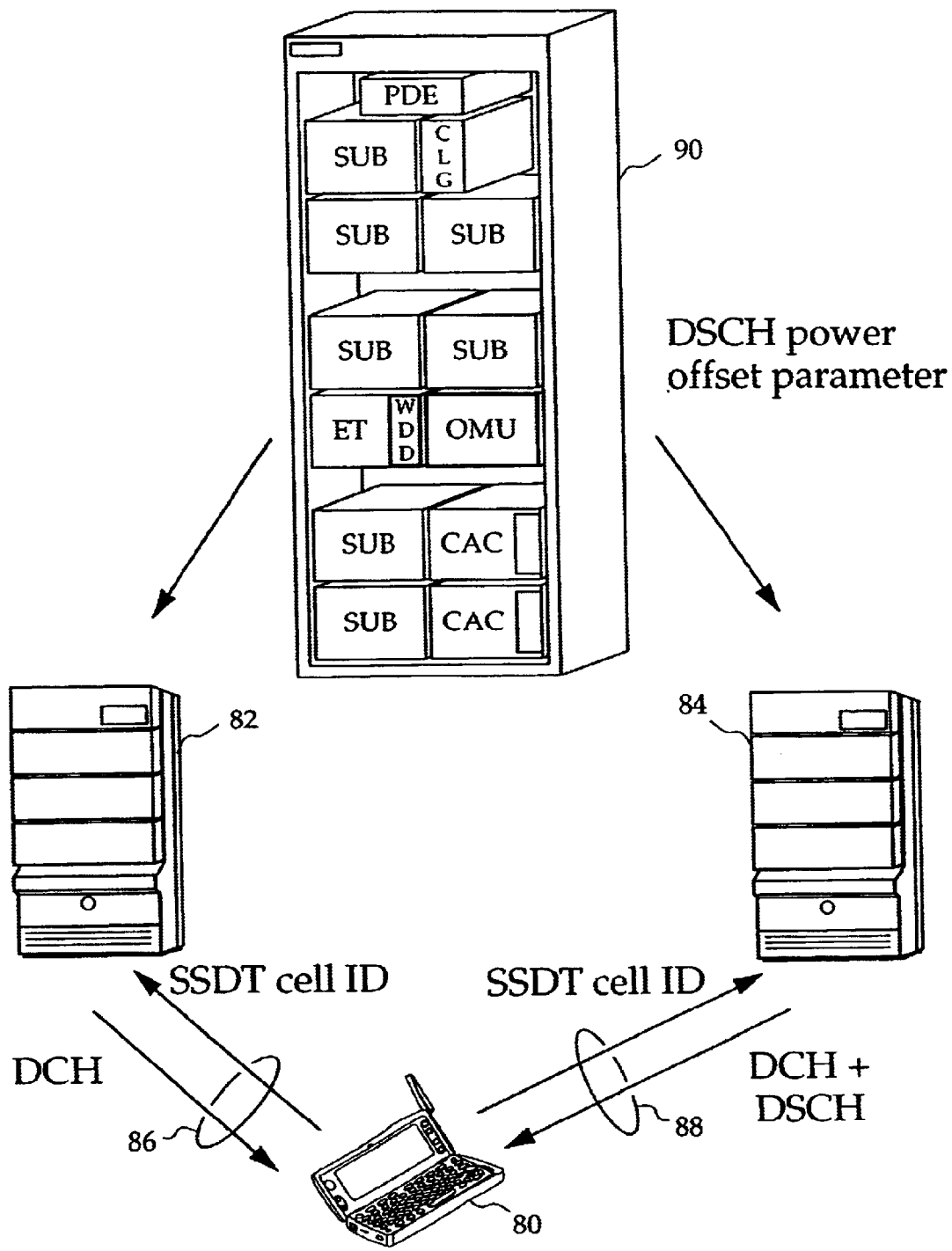
FIG. 13 shows an improved DSCH power control in soft handover for WCDMA, according to the present invention.

Considering the macrodiversity problem mentioned above where the DSCH power control for a terminal may suffer when the power level is set according to a non-dominating dedicated channel, reference is made to FIG. 13, which shows an improved DSCH power control in soft handover for WCDMA, according to the present invention.

Currently, site selection diversity transmit (SSDT) power control is defined in the Third Generation (3G) Technical Specification 25.214 Version 3.1.1 (1999–12) at Sec. 5.2.1.4 as an optional macrodiversity method in soft handover mode. The user equipment (UE) selects one cell from its active set to be primary and periodically informs a primary cell ID to the connecting cells via an uplink in an FBI (feedback information) field. Non-primary cells, not selected by the UE as the primary cell, switch off the transmission power of the DPDCH (Dedicated Physical Data Channel) of the particular DCH associated with the corresponding UE.

In SSDT, according to the 3G TS 25.214 specification at Sec. 5.2.1.4.5, a non-primary cell can switch off its DPDCH output (i.e., no transmissions). The cell manages two downlink transmission power levels, P1, P2. Power level P1 is used for downlink DPCCH (dedicated physical control channel) transmission power level, and this level is updated as described above for ordinary transmit power control (or power control in compressed mode) regardless of the selected state (primary or non-primary). The actual transmission power of TFCI (transmit format combination indicator), TPC (transmit power control), and pilot fields of DPCCH is set by adding P1 and the offsets P01, P02 and P03, respectively.

It should be realized that the currently proposed downlink transmit power control procedure controls simultaneously the power of a DPCCH (dedicated physical control channel) and its corresponding DPDCHs (dedicated physical data channels). The power control loop adjusts the power of the DPCCH and DPDCHs with the same amount, i.e., the relative power difference between the DPCCH and DPDCHs is not changed. According to Sec. 5.2.1.1 of the above-mentioned 3G TS 25.214, Version 3.1.0, the relative transmit power offset between DPCCH fields and DPDCHs is determined by the network. The TFCI, TPC and pilot fields of the DPCCH are offset relative to the DPDCHs' power by P01, P02 and P03 dB respectively. The power offsets may vary in time.

Figure 1:
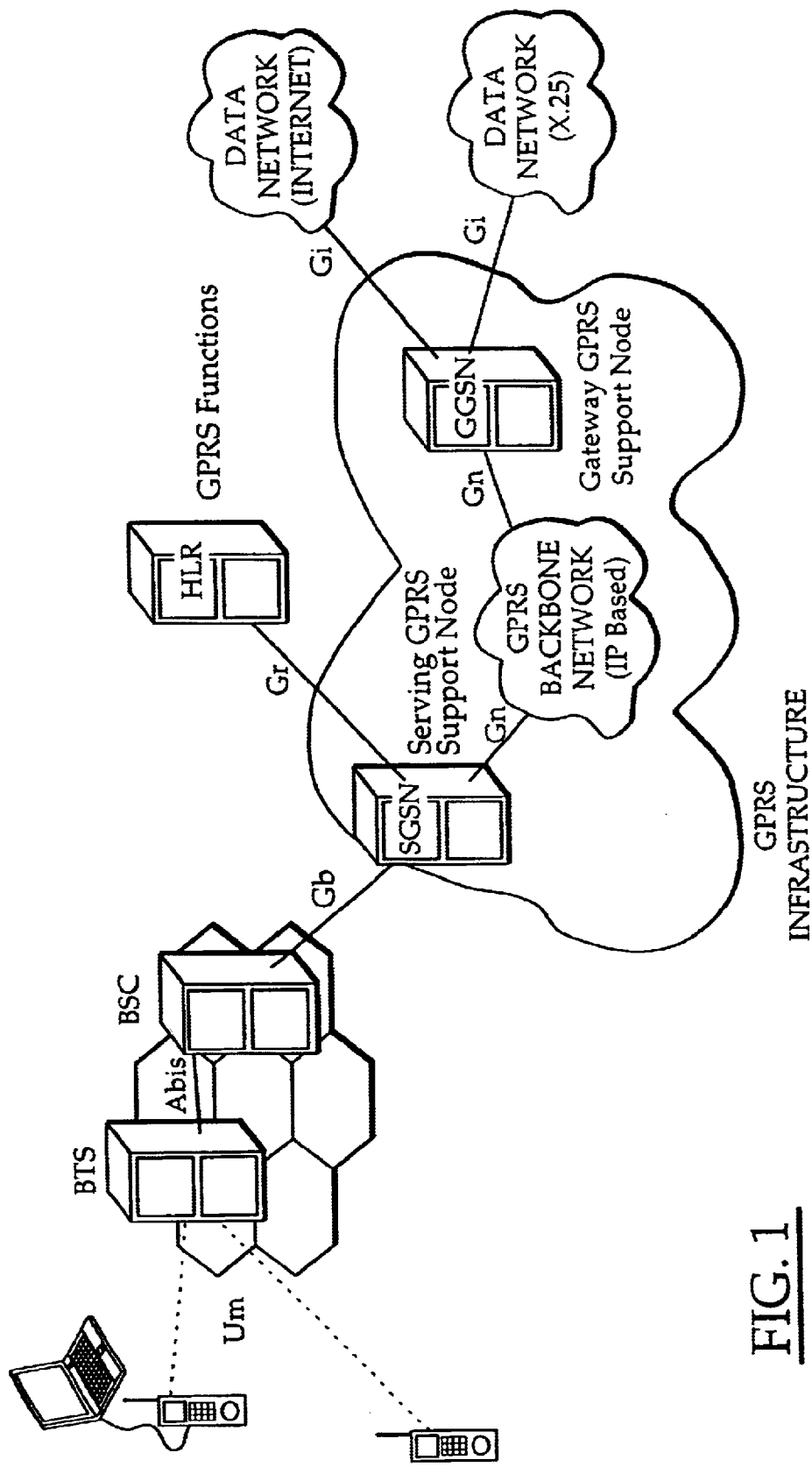
FIG. 1 shows a GPRS infrastructure, according to the prior art.
Figure 2:
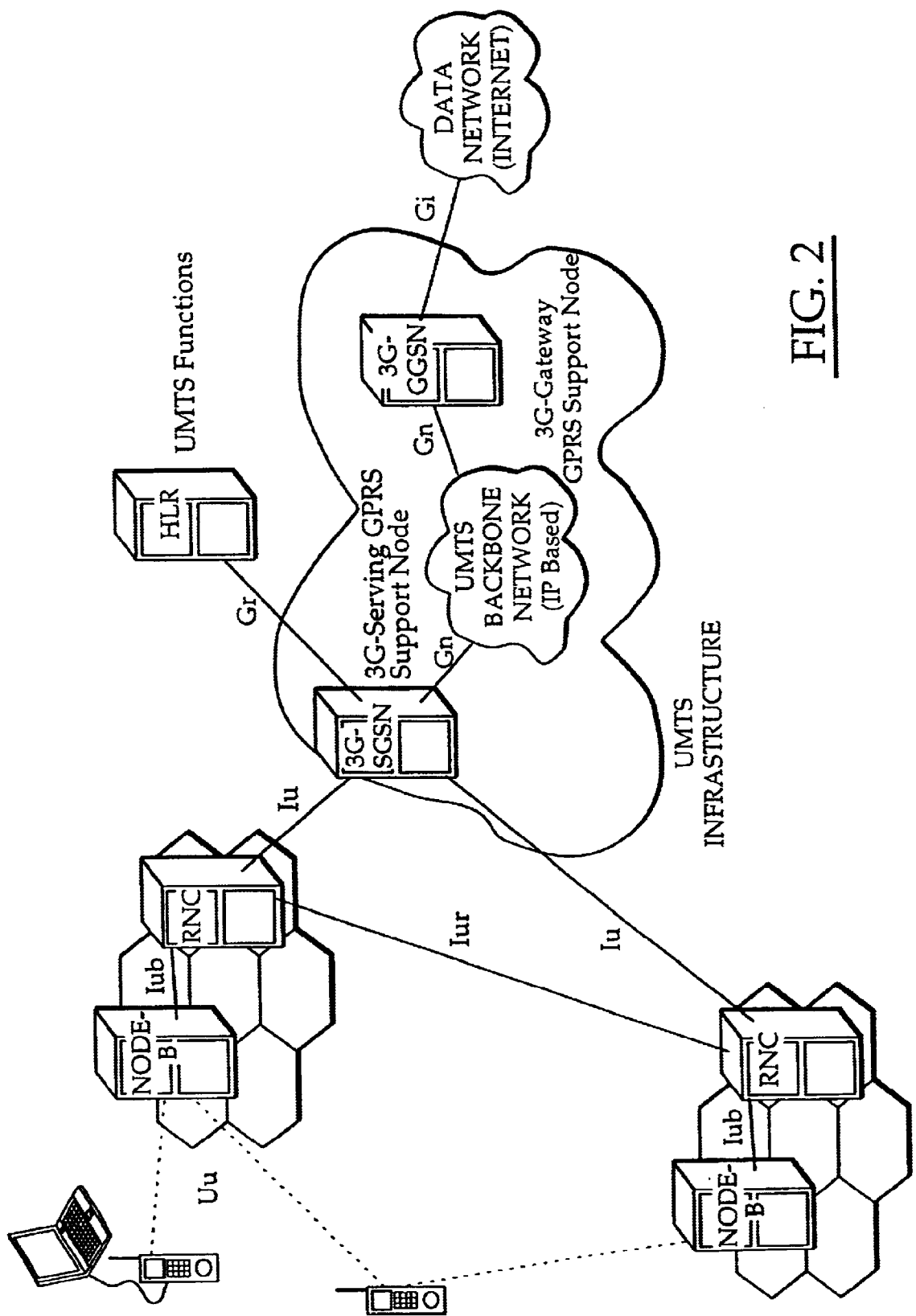
FIG. 2 shows a UMTS infrastructure, according to the prior art.
Figure 3:
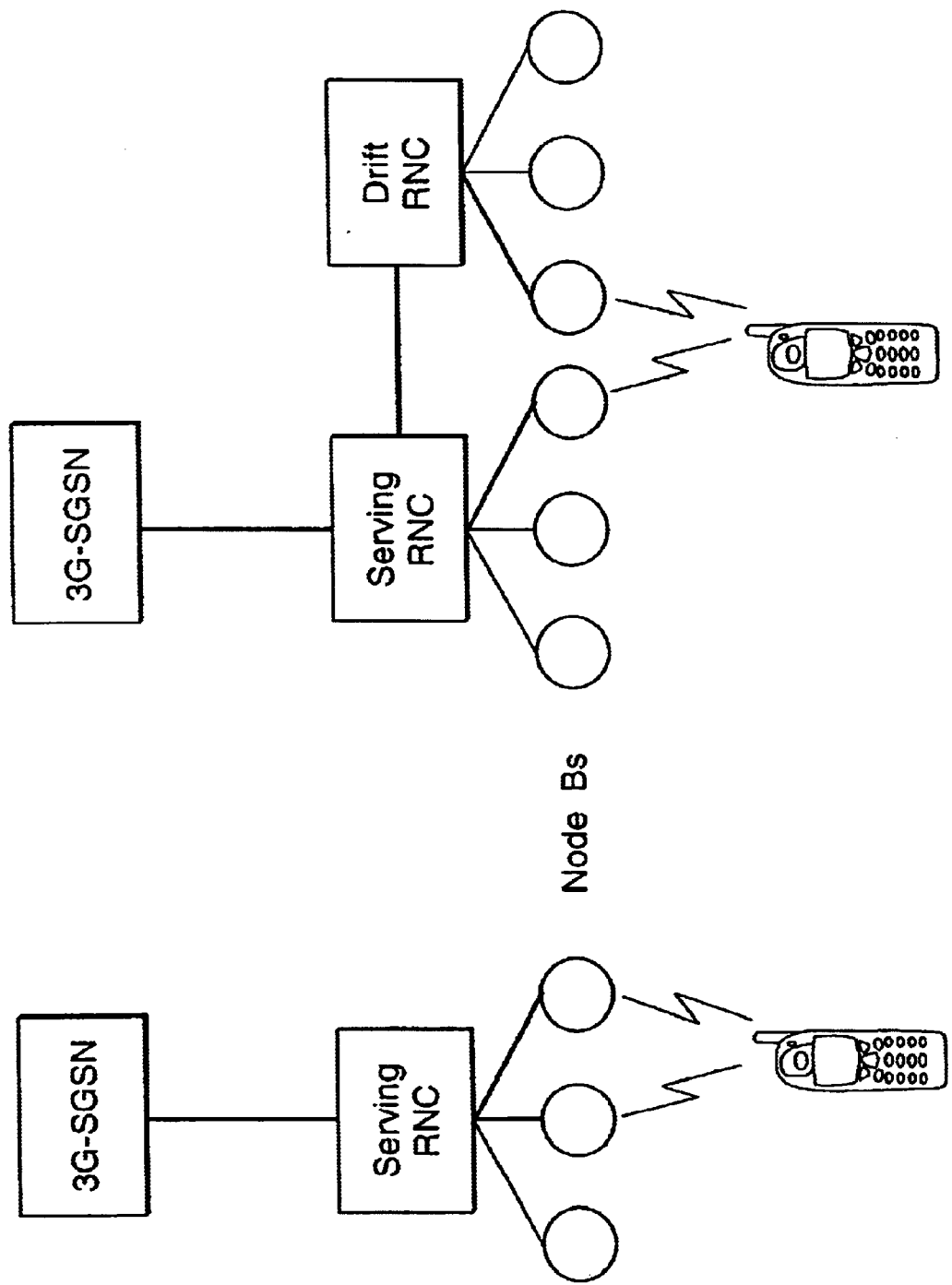
FIG. 3 shows two known examples of macrodiversity for UMTS in which a user equipment simultaneously has radio links with two or more UTRAN access points with the aim of improving quality of the radio connection for providing seamless handover.
Figure 4:
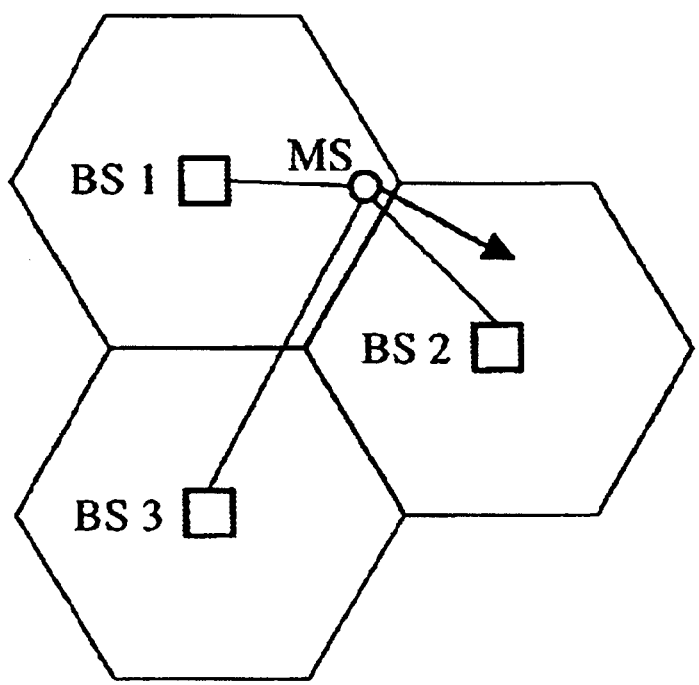
FIG. 4 shows a user equipment in the form of a mobile station moving between cells in a wireless telecommunications network in which the mobile station has the possibility of simultaneously having radio links with two or more of the base stations of the cells in question.
Figure 6:
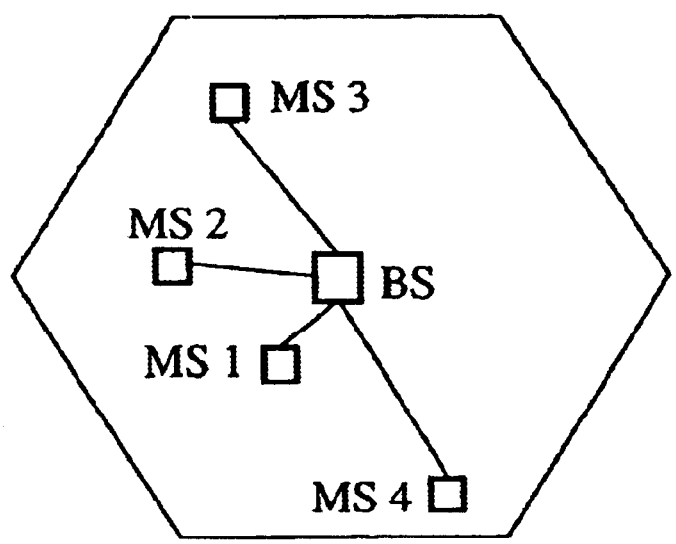
FIG. 6 shows a plurality of base stations situated in a cell-served by a base stations, wherein the distances between the various mobile stations and the base station vary.
Figure 5:
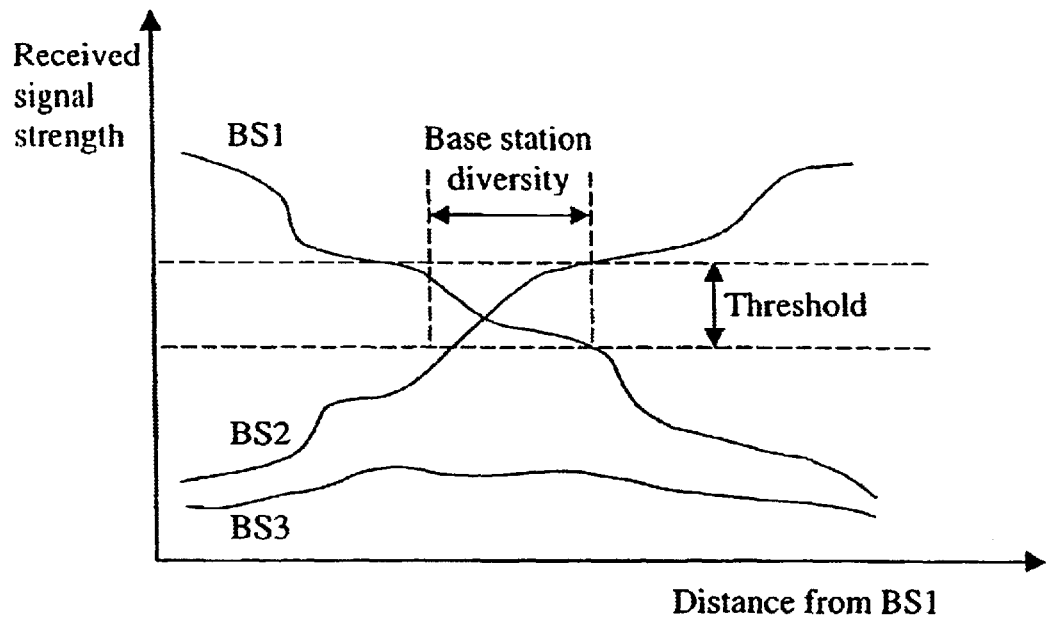
FIG. 5 shows the signal strength of the signals received by the mobile station of FIG. 4 from the base stations in the three cells depicted there as the distance from BS1 increases.

Referring back to FIG. 13, it shows a user equipment (UE) in the form of a communicator (80) in communication with two base stations (Node Bs in 3G) 82, 84 over two corresponding pairs 86, 88 of up and down links. The Node B on the left 82 and the Node B on the right 84 are hardwired to a common radio network controller (RNC) 90, such as one of the RNCs shown in FIG. 2. In other words, each RNC shown in FIG. 2 is connected to multiple Node B base stations, each occupying a particular cell in a group of cells served by the RNC. Each Node B is connected to the RNC by an Iub interface, as shown in FIG. 2. The RNC 90 of FIG. 10 may be connected to another RNC, as suggested in FIG. 2, over another interface called the Iur interface. In this way, the communicator 80 of FIG. 10 can actually move from a group of cells served by one RNC to a group a cells served by another RNC, while at the same time maintaining an active connection at all times and without having to tear down and build up such connections when making such transitions.

In any event, the exemplary DSCH power control can be residing in the Node B or in the RNC, for instance. Although shown residing most conveniently in the base station in FIG. 12, it should be realized that it could be residing in the RNC, or even further upstream, for instance, in the 3G-SGSN of FIG. 2. The DSCH power control can be fast or slow and can be the same as the associated DCH, but in the proposed 3G, the Node B does continually not have the information as to when it is in soft handover, and thus as time goes on during a session the DCH power may become too low to be used as a DSCH reference. This is because the Node B does not have information during the connection whether it is the primary or not at any given point in time. Updating this information with the network would be slow and not necessarily always up to date.

The above-mentioned SSDT gives an indication in soft handover whether a cell is primary or not. The base station (Node B) is expected not to transmit data, but only control information, when the cell ID sent by the UE does not match the base station.

According to an embodiment of the present invention, the SSDT signaling is used regardless of whether the base stations actually use it, and the SSDT is used for its signaling information to configure DSCH transmission power with the principle that if the cell is primary, the DSCH power is set based on the DCH, and if not, then a fixed power level or an offset power level with respect to DCH is used.

For a proposed parameterization over Node B, for the RNC interface (Iub) there will be an offset between DCH and DSCH parameterized as a function of primary indications over an averaging period.

For instance, for Node B the following parameters can be used per radio link:

DSCH is offset when (A) primary or (B) non-primary. More specifically, for case (A) the offset would be 0, i.e., offset is a function of data rate only. For case (B), the offset would be a function of, e.g., primary indications over the last ten frames. Thus, for a 10/10 primary indication, the offset would be 0 dB, while if only one out of 10 frames were indicating the base station to be primary, then a 10 dB offset would be given, for example.

What is claimed is:

1. Method for use in a wireless telecommunications system (1) having at least one user equipment (UE) (10) and a plurality of base stations (20,22,24) connected to a common network controller (76), wherein said UE is able to periodically determine the magnitude of at least one parameter of plural radio downlinks (14,16,18) simultaneously established from more than one of said plurality of base stations to said UE in order to periodically decide which one of said more than one of said plural radio downlinks is from a currently preferred base station for use in a communications session between said UE and an end terminal in communication with said system, comprising the steps of:

periodically signaling on an uplink (60) from said UE to at least one of said more than one of said plurality of base stations that a dedicated downlink to said UE from said at least one of said more than one of said plurality of base stations is or is not from said currently preferred base station; and periodically selecting, in response to said periodic signaling on said uplink from said UE, a power control method for at least a shared downlink to said UE from said at least one of said more than one of said plurality of base stations, wherein, if said signaling step signals that said dedicated downlink from said at least one of said one or more base stations to said UE is from said currently preferred base station, then said step of periodically selecting selects a power control method for a shared downlink to said UE based on a power level of said dedicated downlink to said UE from said currently preferred base station, and wherein the periodic signaling utilizes a site selection diversity transmission (SSDT) in the uplink.

2. The method of claim 1, wherein in response to said signaling step signaling that said dedicated downlink to said UE from said at least one of said one or more base stations is not from said currently preferred base station, said step of periodically selecting selects a fixed power level control method for a shared downlink to said UE from said not currently preferred base station.

3. Apparatus for use in a wireless telecommunications system (1) having at least one user equipment (UE) (10) and a plurality of base stations (20, 22, 24) connected to a common network controller (76), wherein said UE is able to periodically determine the magnitude of at least one parameter of plural radio downlinks (14,16,18) simultaneously established from more than one of said plurality of base stations to said UE in order to periodically decide which one of said more than one of said plural radio downlinks is from a currently preferred base station for use in a communications session between said UE and an end terminal in communication with said system, comprising:

means for periodically signaling (56) on an uplink (60) from said UE to at least one of said more than one of said plurality of base stations that a dedicated downlink to said UE from said at least one of said more than one of said plurality of base stations is or is not from said currently preferred base station; and means for periodically selecting (68), in response to said periodic signaling on said uplink from said UE, a power control method for at least a shared downlink to said UE from said at least one of said more than one of said plurality of base stations, wherein said means for periodically selecting, if said signaling step signals that said dedicated downlink from said at least one of said one or more base stations to said UE is from said currently preferred base station, selects a power control method for a shared downlink based on a power level of said dedicated downlink to said UE from said currently preferred base station, and wherein the periodic signaling utilizes a site selection diversity transmission (SSDT) in the uplink.

4. The apparatus of claim 3, wherein said means for periodically selecting, in response to said signaling step signaling that said dedicated downlink to said UE from said at least one of said one or more base stations is not from said currently preferred base station, selects a fixed power level control method for a shared downlink to said UE from said not currently preferred base station.

5. User equipment (UE) for use in a wireless telecommunications system having at least one said UE and a plurality of base stations connected to a common network controller, wherein said UE is able to periodically determine the magnitude of at least one parameter of plural radio downlinks simultaneously established from more than one of said plurality of base stations to said UE in order to periodically decide which one of said more than one of said plural radio downlinks is from a currently-preferred base station for use in a communications session between said UE and an end terminal in communication with said system, said UE comprising:

sensing means (12), responsive to a dedicated downlink signal (32) from a plurality of base stations for providing a corresponding plurality of sensed signals (42);

storage means (44), responsive to said plurality of sensed signals for storing said plurality of sensed signals and for providing said plurality of sensed signals (46) from storage upon demand;

comparator means (48), responsive to said plurality of sensed signals retrieved from said storage means for comparing a parameter relating to said sensed signals for providing an comparison signal (50) indicative of a comparison between the parameter magnitudes of said sensed signals;

selection means (52), responsive to said comparison signal from said comparator means for selecting a preferred base station and for providing a selection signal (54) indicative thereof; and signaling means, responsive to said selection signal for providing an uplink signal (58) indicative of the preferred base station, wherein the uplink signal uses a site selection diversity transmission (SSDT) to indicate the preferred base station.

6. Apparatus for use in a wireless telecommunications system having at least one user equipment (UE), wherein said system includes a plurality of base stations connected to a common network controller, wherein said UE is able to periodically determine the magnitude of at least one parameter of plural dedicated radio downlinks simultaneously established from more than one of said plurality of base stations to said UE in order to periodically decide which one of said more than one of said plural dedicated radio downlinks is from a currently-preferred base station for use in a communications session between said UE and an end terminal in communication with said system, wherein said apparatus is responsive to a selection signal from a user equipment indicating an identification of a preferred base station, said apparatus comprising:

selecting means (68), responsive to said uplink signal for determining whether the base station is preferred or not and providing a selection signal (70) indicative thereof; and power control means (72), responsive to said selection signal, for providing a downlink control signal (74,14) to said user equipment with a power level selected according to whether or not a preferred base station is determined, wherein the selection signal uses a site selection diversity transmission (SSDT) to identify the preferred base station.

7. The method of claim 2, wherein the dedicated downlink and the shared downlink are different from each other at least in that the UE is able to periodically determine the magnitude of the at least one parameter of the dedicated downlink.

8. The method of claim 1, wherein the dedicated downlink and the shared downlink are different from each other at least in that the UE is able to periodically determine the magnitude of the at least one parameter of the dedicated downlink.

9. The method of claim 4, wherein the dedicated downlink and the shared downlink are different from each other at least in that the UE is able to periodically determine the magnitude of the at least one parameter of the dedicated downlink.

10. The method of claim 3, wherein the dedicated downlink and the shared downlink are different from each other at least in that the UE is able to periodically determine the magnitude of the at least one parameter of the dedicated downlink.

11. The method of claim 2, wherein the dedicated downlink and the shared downlink are different from each other at least in that the dedicated downlink provides a pilot bit.

12. The method of claim 1, wherein the dedicated downlink and the shared downlink are different from each other at least in that the dedicated downlink provides a pilot bit.

13. The method of claim 4, wherein the dedicated downlink and the shared downlink are different from each other at least in that the dedicated downlink provides a pilot bit.

14. The method of claim 3, wherein the dedicated downlink and the shared downlink are different from each other at least in that the dedicated downlink provides a pilot bit.

15. The method of claim 1, wherein the site selection diversity transmission is also for controlling power of at least one dedicated physical channel in the downlink.

16. The apparatus of claim 3, wherein the site selection diversity transmission is also for controlling power of at least one dedicated physical channel in the downlink.

17. Method for use in a wireless telecommunications system (1) having at least one user equipment (UE) and a plurality of base stations, comprising the steps of:

periodically signaling on an uplink from said UE to at least one of said more than one of said plurality of base stations that said at least one of said more than one of said plurality of base stations is or is not a currently preferred base station; and periodically selecting, in response to said periodic signaling, a power control method for at least a shared downlink to said UE from said at least one of said more than one of said plurality of base stations, wherein the periodic signaling utilizes a site selection diversity transmission (SSDT) in the uplink, and wherein the step of selecting uses the SSDT to determine a power offset for the shared downlink.

* * * * *